May 19, 1964 J. H. FENNICK ETAL 3,134,031

STEPPING SWITCH CIRCUIT

Filed Nov. 20, 1961 3 Sheets-Sheet 1

INVENTORS J. H. FENNICK
R. A. KAENEL

BY Lucian C. Canepa

ATTORNEY

INVENTORS J. H. FENNICK
R. A. KAENEL
BY Lucian C. Canepa
ATTORNEY

INVENTORS J. H. FENNICK
R. A. KAENEL
BY Lucian C. Canepa
ATTORNEY

1

3,134,031
STEPPING SWITCH CIRCUIT

John H. Fennick, Plainfield, and Reginald A. Kaenel, Murray Hill, N.J., assignors to Bell Telephone Laboratories, Incorporated, New York, N.Y., a corporation of New York Filed Nov. 20, 1961, Ser. No. 153,364
2 Claims. (Cl. 307—88.5)

Figure 1:
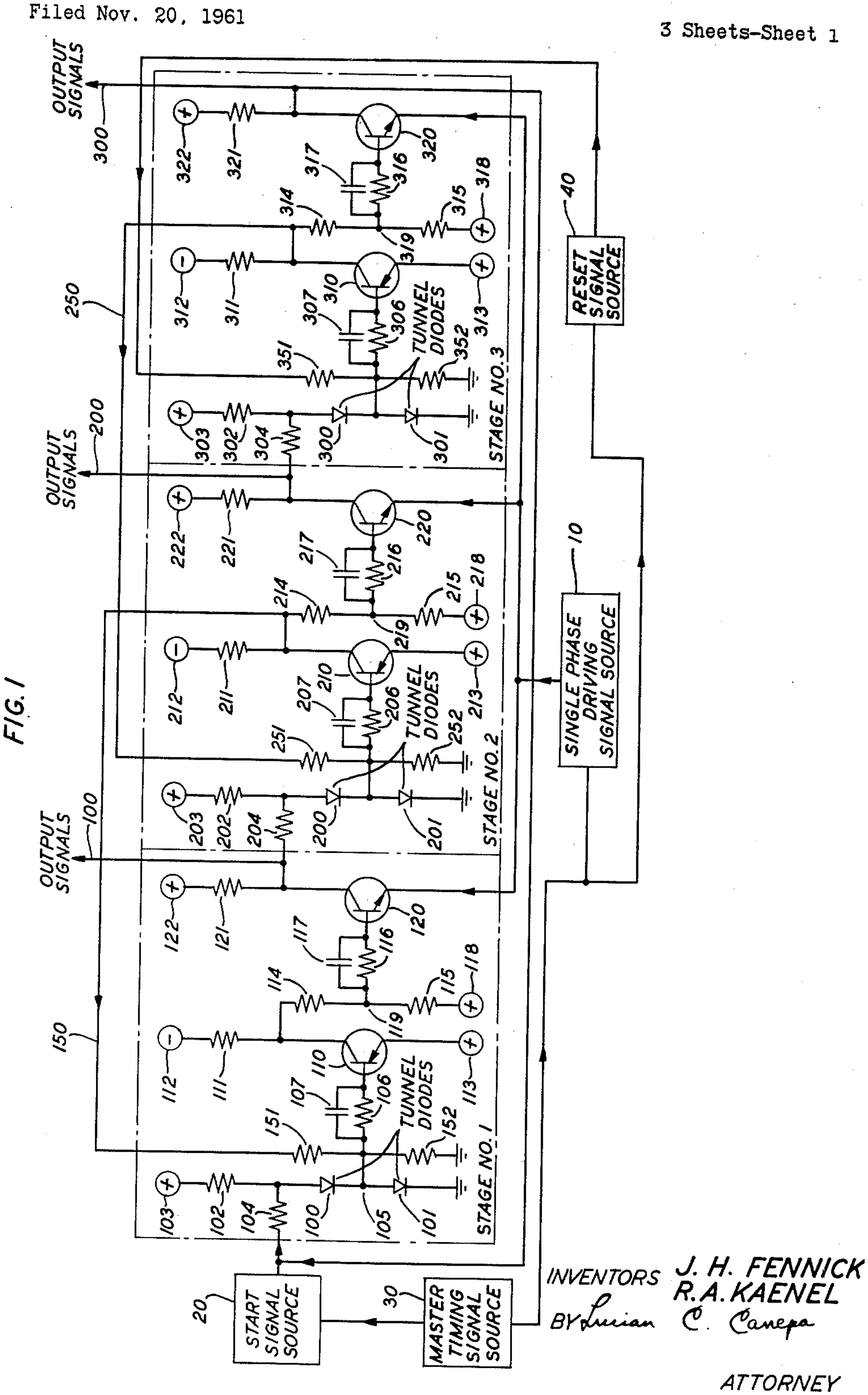

This invention relates to signal processing circuits, and more particularly to a high speed stepping switch circuit.

Stepping switch circuits are useful in information processing systems as timing signal sources to sequentially control the operation of the systems. A typical such circuit requires for its operation either a single phase driving signal source whose output wave shape is rectangular in form or a multiphase driving signal source.

An object of the present invention is the improvement of a signal processing circuits, particularly stepping switch circuits.

Another object of this invention is the provision of stepping switch circuits which are characterized by high speed, simplicity of design and high reliability.

A further object of the present invention is the provision of stepping switch circuits which operate from very low power single phase driving signal sources whose output wave shapes need not be exactly rectangular in form.

Still another object of this invention is the provision of high speed stepping switch circuits in which the single phase driving power required therefor is independent of the number of stages thereof.

These and other objects of the present invention are realized in a specific illustrative stepping switch circuit embodiment that includes a plurality of stages each of which comprises a switching transistor and a configuration, including two bistable-biased voltage-controlled negative resistance diodes connected in series-aiding, for controlling the energization condition of the transistor. The switching transistors of the illustrative circuit are driven by a single phase signal source, the application of a start signal to the series-aiding diodes in the first stage of the circuit initiating a cycle of operation in which driving signals are transferred in sequence to the respective output paths of the switching transistors.

The appearance of a signal on the output path of a stage causes the series-aiding diodes in the next following stage to commence a switching cycle of operation. The diodes in the next stage do not, however, actually switch to the state in which the transistor associated therewith is driven into its energized condition until the signal appearing at the output of the previous stage decreases from its maximum value to a predetermined lower value. By the time that the diodes have so switched and their new state is effective to energize the associated switching transistor, the driving signal no longer exists at the output of the single phase source. Hence there is no possibility of two adjacent stages being simultaneously energized to pass driving signals therethrough to their respective output paths.

The signal that actually energizes the switching transistor in the next stage also resets the bistable configuration in the previous stage to the state in which its associated switching transistor is deenergized or closed to the passage therethrough of driving signals. Thus, only the next stage responds to the next subsequent driving signal to its output path.

An illustrative stepping switch circuit made in accordance with the principles of the present invention also comprises an arrangement for resetting the diodes included in the last stage of the circuit and, in addition, comprises a master timing signal source for coordinating the overall operation of the circuit.

2

It is a feature of the present invention that a stepping switch circuit include a plurality of stages each of which comprises a switching transistor and two bistable-biased voltage-controlled negative resistance diodes connected in series-aiding for controlling the condition of the transistor.

It is another feature of this invention that a stepping switch circuit include a single phase driving signal source, and that the circuit further include a plurality of driven stages each of which comprises a switching transistor and two bistable-biased voltage-controlled negative resistance diodes connected in series-aiding for controlling the condition of the transistor.

It is still another feature of the present invention that a stepping switch circuit include a single phase driving signal source, a plurality of driven stages each of which comprises a switching transistor and two bistable-biased voltage-controlled negative resistance diodes connected in series-aiding for controlling the condition of the transistor, and that the bistable-biased diodes included in each stage do not actually switch to the state in which the associated switching transistor is energized until the trigger signal applied to switch the diodes decreases from its maximum value to a predetermined lower value.

Figure 2A:
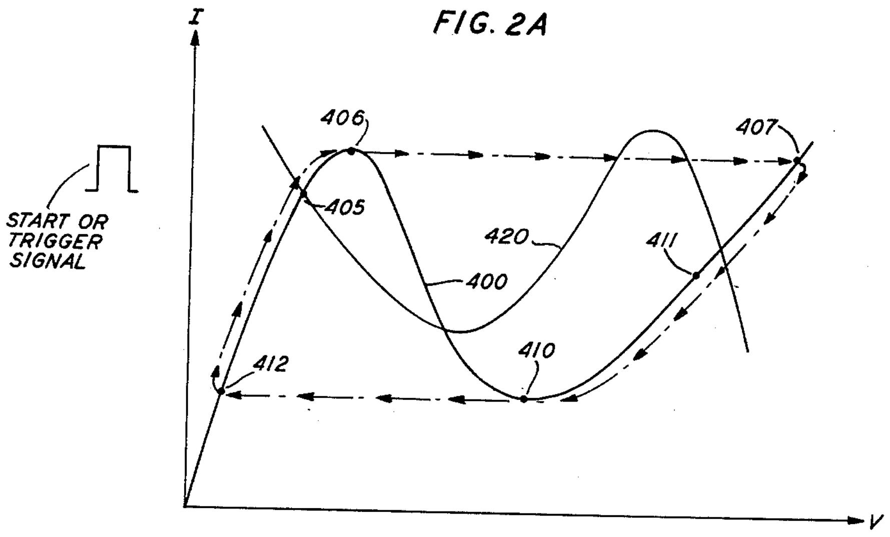
Figure 2B:
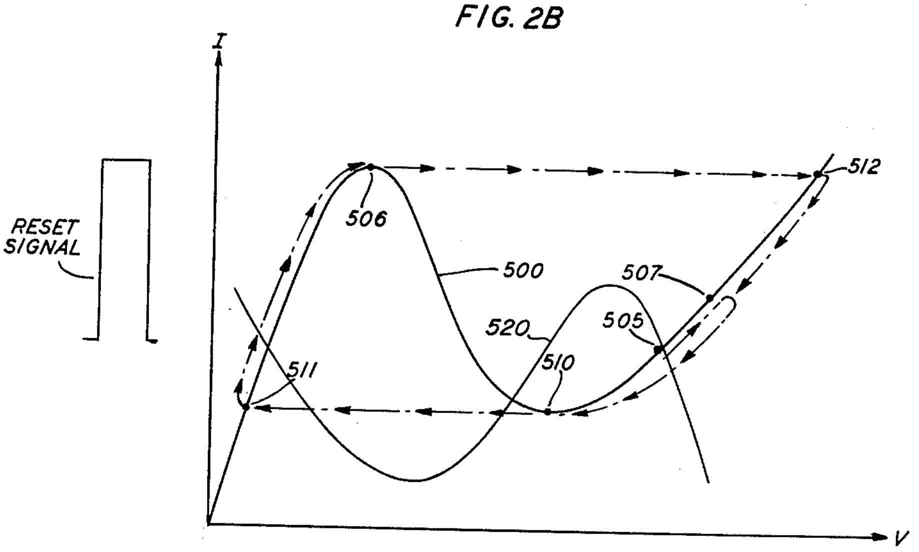
Figure 3:
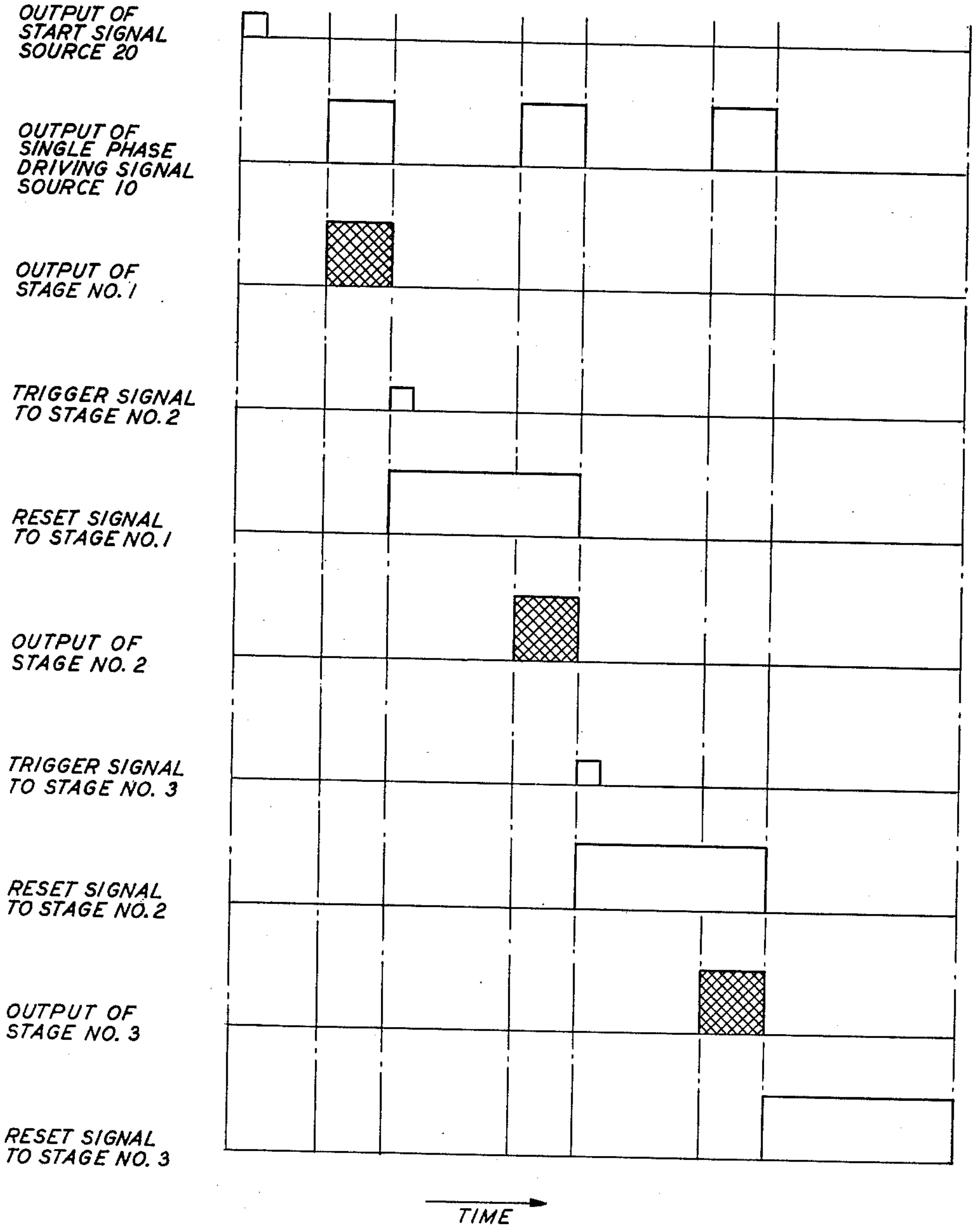

A complete understanding of the present invention and of the above and other features and advantages thereof may be gained from a consideration of the following detailed description of an illustrative embodiment thereof presented hereinbelow in connection with the accompanying drawing, in which:

FIG. 1 depicts a specific illustrative stepping switch circuit made in accordance with the principles of the present invention;

FIGS. 2A and 2B, respectively, illustrate the voltage-current characteristic curves for the two series-aiding negative resistance diodes included in each stage of the circuit shown in FIG. 1 and, further, indicate the type of diode switching action that takes place in each stage of the circuit in response to the application to a stage of a trigger or switching signal; and FIG. 3 shows various waveforms characteristic of the circuit depicted in FIG. 1.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P-N Junctions," L. Esaki, Physical Review, volume 109, January-March 1958, pages 603–604; "Tunnel Diodes as High-Frequency Devices," H. S. Sommers, Jr., Proceedings of the Institute of Radio Engineers, volume 47, July 1959, pages 1201–1206; and "High-Frequency Negative-Resistance Circuit Principles for Esaki Diode Applications," M. E. Hines, The Bell System Technical Journal, volume 39, May 1960, pages 477–513.

Referring now to FIG. 1, there is shown in detail a specific three-stage stepping switch circuit which illustratively embodies the principles of the present invention. The stages are identical to each other and include leads 100, 200 and 300 on which output signals appear in sequence in response to the application to the stages of driving signals from a single phase source 10. The output signal waveforms of the source 10 are shown in the second row of FIG. 3, and the waveforms of the signals that appear at the outputs of stages 1, 2 and 3 are represented in FIG. 3 by pulses which have been cross-hatched to make them stand out from the other signals represented there.

Stage No. 1 includes two voltage-controlled negative resistance diodes 100 and 101 connected in series-aiding, a second switching transistor 110 of the PNP type and a first switching transistor 120 of the NPN type. The diodes 100 and 101 are biased for bistable operation by a resistor 102 and a positive source 103. (The switching action of the diodes 100 and 101 in response to an applied trigger signal is described in detail hereinbelow.) Connected to the plate electrode of the diode 100 is an input resistor 104, and connected to a node point 105 between the diodes 100 and 101 is a coupling network comprising a resistor 106 and a capacitor 107, the network connecting the node point 105 to the base of the second switching transistor 110. The collector of the transistor 110 is connected via a bias resistor 111 to a negative source 112, while the emitter of the transistor 110 is connected to a positive source 113. Also, the collector of the transistor 110 is connected via resistors 114, 115, 116, capacitor 117 and a positive source 118 to the base of the first switching transistor 120 whose collector is connected to the output lead 100 and whose emitter is directly connected to the output of the single phase driving signal source 10. Additionally, the collector of the transistor 120 is connected via a resistor 121 to a positive bias source 122.

Normally, the lower negative resistance diode 101 in stage No. 1 is biased to a relatively high voltage, low current stable operating point on its voltage-current characteristic curve, and the upper negative resistance diode 100 is biased to a relatively low voltage, high current stable operating point on its characteristic curve. The relatively high voltage appearing across the lower diode 101 is sufficiently positive with respect to the potential of the source 113 connected to the emitter of the transistor 110 to bias the transistor 110 to a nonconducting condition. With the transistor 110 nonconducting, the network comprising the resistors 111, 114 and 115 divides the voltages of the sources 112 and 118 such that the potential of node point 119 is sufficiently negative with respect to the emitter of the first switching transistor 120 to bias the transistor 120 to its nonconducting or blocked condition. With the transistor 120 blocked, the output of the single phase driving signal source 10 is not transferred to the output lead 100. Quiescently, the first switching transistors 220 and 320 in stages 2 and 3, respectively, are also nonconducting or blocked as a result of their respective associated lower diodes 201 and 301 being in their relatively high voltage states. Under such conditions, the output of the source 10 is also not transferred to the output leads 200 and 300.

Assume now that the start source 20 applies, under control of a master timing signal source 30, a positive signal via the input resistor 104 to switch the bistable-biased diodes 100 and 101 to the stable state in which the upper diode 100 operates at a relatively high voltage, high current point on its characteristic curve and the lower diode 101 operates at a relatively low voltage, low current point on its characteristic curve. As will be apparent from the specific description hereinbelow of the switching action of the diodes 100 and 101, the lower diode 101 does not actually switch to its stable low voltage point until the waveform of the applied start signal decreases from its maximum value to a predetermined lower value.

As a result of the switching of the lower diode 101 in stage No. 1 to its relatively low voltage stable point, the transistor 110 is driven into its conducting state which, in turn, causes the potential of the node point 119 to assume a sufficiently positive value that the first switching transistor 120 is energized and remains energized even when a positive signal is applied to the emitter thereof from the single phase driving signal source 10. Consequently the next signal from the source 10 is transferred via the energized or unblocked transistor 120 to the output lead 100.

The signal appearing on the output lead 100 of stage No. 1 in response to a driving signal from the source 10 is applied via input resistor 204 as a trigger signal to the bistable-biased series-aiding diodes 200 and 201 in stage No. 2. This signal switches the diode arrangement to the stable state wherein stage No. 2 is primed to pass to its output lead 200 the next driving signal from the source 10. The diode arrangement in stage No. 2 does not, however, actually switch to this stable state until the trailing edge of the applied trigger signal from stage No. 1 decreases to a predetermined level. As a result, the driving signal from the source 10 terminates before the first switching transistor 220 is actually unblocked. Hence, the first driving signal is transferred only to the output lead 100 of stage No. 1.

When the diode arrangement in stage No. 2 switches in approximate time coincidence with the trailing edge of the trigger or switching signal applied thereto from stage No. 1, the second switching transistor 210 is energized and a positive pulse appears at the collector thereof. This positive pulse is coupled via a reset path 150 including resistors 151 and 152 to the node point 105 between the diodes 100 and 101 in stage No. 1 to reset the diode arrangement thereof to the state in which the transistors 110 and 120 are deenergized.

Hence, when at a later time another driving signal appears at the output of the source 10, this subsequent driving signal is transferred via the energized transistor 220 in stage No. 2 to the output path 200 but is not passed through the blocked transistors 120 and 320 in stages 1 and 3, respectively, to appear on their respective output leads 100 and 300.

The signal appearing on the output lead 200 of stage No. 2. is applied via input resistor 304 as a trigger signal to the bistable-biased series-aiding diodes 300 and 301 in stage No. 3. This trigger signal switches the diode arrangement to the stable state where stage No. 3 is primed to pass to its output lead 300 the next driving signal from the source 10. The diodes in stage No. 3 do not, however, actually switch to this stable state until the trailing edge of the applied trigger signal from stage No. 2 reaches a predetermined level. As a result, the driving signal from the source 10 terminates before the first switching transistor 320 is actually unblocked.

When the diode arrangement is stage No. 3 switches, the transistor 310 is energized and a positive pulse appears at the collector thereof. This positive pulse is coupled via a reset path 250 including resistors 251 and 252 to the node point 205 between the diodes 200 and 201 in stage No. 2 to reset the diode arrangement to the state in which the transistors 210 and 220 are deenergized.

Hence, when another driving signal subsequently appears at the output of the source 10, this driving signal is transferred via the energized transistor 320 in stage No. 3 to the output path 300 but is not passed through the blocked transistors 120 and 220 in stages 1 and 2, respectively, to appear on their respective output leads 100 and 200.

The signal appearing on the output lead 300 of stage No. 3 may be applied via path 340 and the input resistor 104 as a trigger signal to stage No. 1 to initiate another complete cycle of operation of the herein-described illustrative three-stage stepping switch circuit.

It is noted that the depicted circuit includes a source 40 for supplying a reset signal to the series-aiding diodes 300 and 301 included in stage No. 3. If, on the other hand, the circuit shown in FIG. 1 is intended to repeatedly recycle through complete stepping operations of the type described herein, a reset signal for the diodes 300 and 301 may be derived directly from the collector of the transistor 110 in stage No. 1.

The manner of operation of the series-aiding diodes included in each of the stages of the specific illustrative stepping switch circuit shown in FIG. 1 can best be understood by reference to FIGS. 2A and 2B. FIG. 2A depicts the voltage-current characteristic curve 400 of the upper diode of each of the diode arrangements included in FIG.

1, while FIG. 2B depicts the characteristic curve 500 of the lower diode of each of the arrangements. Included in FIGS. 2A and 2B are lines 420 and 520 which are respectively representative of the loads connected to the upper and lower diodes. The load for each diode comprises the other diode connected in series aiding therewith and, in addition, the various resistive elements connected thereto. To provide a specific example of the switching action of each of the diode arrangements, there is described in detail hereinbelow the operation of the diodes 100 and 101 in stage No. 1, it being understood that the diode arrangements in stages 2 and 3 function in an identical manner.

The parameters of the diode arrangement shown in stage No. 1 of FIG. 1 are so chosen that quiescently neither one of the negative resistance diodes 100 and 101 operates in its region of negative resistance but instead one diode operates in its forward positive resistance region on one side of the negative resistance region of its characteristic curve at a relatively low voltage value and the other diode operates in its forward positive resistance region on the other side of the negative resistance portion at a relatively high voltage value. Also, the diode arrangement in stage No. 1 is so arranged that quiescently a current flows from the node point 105 to the right and upwards through the resistor 151 to the source 212. In other words, under quiescent conditions the upper diode 100 conducts more current therethrough than does the lower diode 101. Furthermore, the arrangement including the diodes 100 and 101 is initially set by means of a suitable source (not shown) to the state in which the voltage across the lower diode 101 is relatively high. Therefore the lower diode 101 is initially set to a relatively high voltage, low current operating point and the upper diode 100 is accordingly set to a relatively low voltage, high current operating point. These operating points are represented in FIGS. 2A and 2B and are designated 405 and 505, respectively, for the diodes 100 and 101.

The application of a start or trigger signal from the source 20 to the diodes 100 and 101 in stage No. 1 causes the operating point 405 of the upper diode 100 to switch over the peak point 406 thereof to a point 407 on the relatively high voltage positive resistance region of its characteristic curve. At the same time the operating point of the lower diode 101 shifts upwards from the point 505 to a higher current point 507, the current flowing through the upper diode 100 remaining, however, greater than that through the lower diode 101. The maximum amplitude of the applied trigger signal is so chosen that both diodes 100 and 101 remain in their relatively high voltage states as long as the applied signal persists at its maximum level.

Subsequently, as the amplitude of the applied trigger signal begins to decrease, the operating points 407 and 507 shift downwards toward the valley points 410 and 510 of the curves 400 and 500, respectively. During this downward shifting, the operating point of the lower diode 101 leads the way, for, as specified above, the current therethrough is less than that through the upper diode 100. Finally, as the waveform of the applied trigger signal decreases to a predetermined level, the operating point of the lower diode 101 switches past the valley point 510 to a point 511 on the relatively low voltage positive resistance region of its characteristic curve 500, while the operating point of the diode 100 shifts to a lower voltage point 411 on its curve 400. At this time, in approximate coincidence with the occurrence of the trailing edge of the trigger signal, the transistors 110 and 120 in stage No. 1 are actually energized or unblocked as a result of the relatively low voltage appearing across the lower diode 101.

The subsequent application of a positive reset signal to the node point 105 of the diode arrangement in stage No. 1 causes a current to flow downwards through the resistor 151 and to the left towards the point 105. Substantially all of this current flows downward through the lower diode 101, thereby causing its operating point to switch over the peak point 506 thereof to a point 512 on the relatively high voltage positive resistance region of its characteristic curve. During the persistence of the reset signal, the operating points of the diodes 100 and 101 shift downward on their respective characteristic curves, with the operating point of the upper diode 100 now leading the way. Finally, the operating point of the upper diode 100 switches past its valley point 410 to a relatively low voltage point 412. Lastly, the operating points of the diodes 100 and 101 shift to the initial operating points 405 and 505, respectively. The diodes are then ready to respond to another start or trigger signal to undergo another complete switching cycle of operation of the type described in detail above.

One significant advantage of the illustrative stepping switch circuit described herein is that the trailing edge of the trigger or switching signal applied to each state need not be sharply defined. Thus, although the start, driving and trigger signals depicted in FIG. 3 are shown as being rectangular in form, it is to be understood that any periodic wave shape of suitable amplitude to effect switching of the series-aiding diodes is satisfactory to ensure reliable operation of the described circuit.

It is noted that detailed circuit configurations for the sources 10, 20, 30 and 40 have not been presented herein, as the detailed structures of these units are considered, in view of the functional requirements therefor set forth hereinabove, to be clearly within the skill of the art.

Although only a three-stage stepping switch circuit has been described and depicted in FIG. 1, it is to be clearly understood that the principles of the present invention extend to an n-stage stepping switch circuit. Significantly, the driving power required from the source 10 remains constant regardless of the number of stages included in the circuit, because, as indicated above, only one stage at a time draws power from the single phase source 10.

Additionally, it is emphasized that although particular attention herein has been directed to the use of tunnel diodes as the voltage-controlled negative resistance elements of the circuit shown in FIG. 1, and the use of transistors as the switching devices, other suitable arrangements having characteristics similar thereto may be substituted therefor.

Furthermore, it is to be understood that the above-described arrangements are only illustrative of the application of the principles of the present invention. Numerous other arrangements may be developed by those skilled in the art without departing from the spirit and scope of this invention.

What is claimed is:

1. In combination in a stepping switch circuit, a plurality of stages arranged in a linear array, each of said stages including switching means characterized by an energized and a de-energized condition, a different output path connected to each of said switching means, each stage further including bistable means including two voltage-controlled negative resistance diodes connected in series aiding for controlling the condition of the switching means in the corresponding stage, means connected to the series-aiding diodes in said stages for quiescently biasing them for bistable operation at operating points at which the corresponding switching means are de-energized, each of said switching means comprising a switching transistor of one conductivity type having base, emitter and collector electrodes, said collector electrode of each switching transistor being connected to the associated output path in the same stage, each of said switching means further comprising an intermediate transistor of the opposite conductivity type having base, emitter and collector electrodes, means connecting the midpoint of the series-aiding diodes of each stage to the base electrode of the associated intermediate transistor, network means connecting the collector electrode of each intermediate transistor to the base electrode of the associated switching transistor, means connected to the collector electrodes of said intermediate and switching transistors, to the emitter electrodes of said intermediate transistors and to said network means for supplying operating potentials to the switching means in said stages, single phase signal source means connected to the emitter electrodes of the switching transistors in said stages for applying driving signals thereto, a start signal source connected to the bistable means in the first stage of said array for switching said bistable means to the state in which the switching means in said first stage is energized to pass a driving signal from said single phase source to the output path associated with said first stage, and means interconnecting adjacent stages and responsive to a driving signal appearing on the output path of a stage for initiating the switching of the bistable means in the next following stage.

2. A combination as in claim 1 further including means responsive to the energization of the intermediate transistor of a stage for resetting the bistable means in the previous stage of said array to the state which causes the intermediate and switching transistors in said previous stage to be de-energized.

References Cited in the file of this patent

UNITED STATES PATENTS

| | | |
|---|---|---|
| 3,021,450 | Jiu | Feb. 13, 1962 |
| 3,040,190 | Buelow | June 19, 1962 |